United States Patent
Idesawa et al.

(10) Patent No.: US 11,940,787 B2
(45) Date of Patent: Mar. 26, 2024

(54) CONTROL DEVICE, METHOD, PROGRAM, AND SYSTEM USING MACHINE LEARNING TECHNOLOGY

(71) Applicant: AISing LTD., Tokyo (JP)

(72) Inventors: Junichi Idesawa, Tokyo (JP); Shimon Sugawara, Tokyo (JP)

(73) Assignee: AISing LTD., Tokyo (JP)

( * ) Notice: Subject to any disclaimer, the term of this patent is extended or adjusted under 35 U.S.C. 154(b) by 106 days.

(21) Appl. No.: 17/639,956

(22) PCT Filed: Oct. 21, 2019

(86) PCT No.: PCT/JP2019/041362
§ 371 (c)(1),
(2) Date: Mar. 3, 2022

(87) PCT Pub. No.: WO2021/079411
PCT Pub. Date: Apr. 29, 2021

(65) Prior Publication Data
US 2022/0326661 A1 Oct. 13, 2022

(51) Int. Cl.
*G05B 13/02* (2006.01)
*G05B 6/02* (2006.01)
*G05B 13/04* (2006.01)

(52) U.S. Cl.
CPC ........... *G05B 6/02* (2013.01); *G05B 13/0265* (2013.01); *G05B 13/048* (2013.01)

(58) Field of Classification Search
CPC ..... G05B 6/02; G05B 13/0265; G05B 13/048
(Continued)

(56) References Cited

U.S. PATENT DOCUMENTS 5,841,946 A 11/1998 Naito et al.
5,852,817 A 12/1998 Kano
(Continued)

FOREIGN PATENT DOCUMENTS

CN 109948670 A 6/2019
EP 3 767 399 A1 1/2021
(Continued)

OTHER PUBLICATIONS

Extended European Search Report with the Supplementary European Search Report and the European Search Opinion issued by the European Patent Office for corresponding European Patent Application No. 19950019.0-1205, dated Jun. 15, 2023.
(Continued)

*Primary Examiner* — Jigneshkumar C Patel
(74) *Attorney, Agent, or Firm* — Myers Wolin, LLC

(57) ABSTRACT

A control device includes a first controller configured to generate a first operation amount for the device on the basis of an output fed back from the device and a target value, a predicted output generator including a learned model which is machine learned so as to generate a predicted output from the device on the basis of the output fed back from the device and the first operation amount, a second controller configured to generate a second operation amount for the device on the basis of the predicted output and the target value, an integrated operation amount generator configured to generate an integrated operation amount which is an operation amount for the device on the basis of the first operation amount and the second operation amount.

10 Claims, 12 Drawing Sheets

(58) Field of Classification Search
USPC .......................................................... 700/42
See application file for complete search history.

(56) References Cited

U.S. PATENT DOCUMENTS

| | | | |
|---|---|---|---|
| 10,382,260 | B1 | 8/2019 | Narang et al. |
| 2011/0139509 | A1* | 6/2011 | Pool ........................ E21B 21/08 |
| | | | 703/7 |
| 2017/0326726 | A1 | 11/2017 | Grotmol et al. |
| 2018/0314242 | A1* | 11/2018 | Hirose ............. G05B 19/41885 |
| 2019/0138933 | A1* | 5/2019 | Kim ........................ G06F 16/283 |
| 2019/0294126 | A1 | 9/2019 | Watanabe |
| 2020/0233316 | A1 | 7/2020 | Asano et al. |

FOREIGN PATENT DOCUMENTS

| | | | |
|---|---|---|---|
| JP | H06-332501 A | | 12/1994 |
| JP | H06332501 A | * | 12/1994 |
| JP | H07-152404 A | | 6/1995 |
| JP | H07152404 A | * | 6/1995 |
| JP | H07-210209 A | | 8/1995 |
| JP | H07-210535 A | | 8/1995 |
| JP | H09-114503 A | | 5/1997 |
| JP | H10-275002 A | | 10/1998 |
| JP | 2000-187505 A | | 7/2000 |
| JP | 2016-173686 A | | 9/2016 |
| JP | 2018-26020 A | | 2/2018 |
| JP | 2019-71405 A | | 5/2019 |
| JP | 2019-166603 A | | 10/2019 |
| WO | 2019/176496 A1 | | 9/2019 |

OTHER PUBLICATIONS

Peltoniemi et al., "Observer-Based Output Voltage Control for DC Power Distribution Purposes", IEEE Transactions on Power Electronics, Apr. 2013, pp. 1914-1926, vol. 28, No. 4.
International Search Report issued by the Japan Patent Office for corresponding International Patent Application No. PCT/JP2019/041362, dated Dec. 17, 2019, with an English translation.
Notice of Reasons for Refusal issued by the Japan Patent Office for corresponding Japanese Patent Application No. 2020-203983, dated Aug. 9, 2023, with an English translation.

* cited by examiner

CONTROL DEVICE, METHOD, PROGRAM, AND SYSTEM USING MACHINE LEARNING TECHNOLOGY

CROSS-REFERENCE TO RELATED APPLICATION

This application is a National Phase of PCT/JP2019/041362, filed on Oct. 21, 2019, and which designated the U.S. The contents of which are wholly incorporated herein by reference.

TECHNICAL FIELD

The present disclosure relates to a control device that performs feedback control.

BACKGROUND ART

Feedback control, for example, PID control is widely used to control various devices. While the feedback control belongs to classical control, the feedback control is still a main control method in industry even now because of reliability based on past performance and easiness of adjustment by rules of thumb of engineers.

FIG. 11 is a view illustrating a basic configuration of feedback control in related art, that is, a feedback system 200 in related art. As can be clear from the drawing, an output y obtained from a detector (such as, for example, a sensor) of a control mechanism 202 is fed back to an input side in a left part of the drawing, and deviation with a target value r is calculated. The calculated deviation is further input to a controller 201, so that an operation amount u is calculated. An operator (such as, for example, an actuator) of the control mechanism 202 operates in accordance with the operation amount u to control a control target which is not illustrated. In this event, there is a case where disturbance w is included. By this series of processes being repeated, control so as to make deviation smaller, that is, control so as to make the output y closer to the target value r is performed.

Meanwhile, in recent years, a machine learning field has attracted great attention. In such a background, inventors of the present application have advocated a new machine learning framework having a tree structure (learning tree) (Patent Literature 1).

FIG. 12 is an explanatory diagram illustrating the above-described new machine learning framework, that is, an explanatory diagram illustrating a structure of the learning tree. FIG. 12(a) illustrates a structure of the learning tree in the learning method, and FIG. 12(b) illustrates an image of state spaces corresponding to the structure. As can be clear from the drawing, the structure of the learning tree is constituted by branching and disposing respective nodes corresponding to respective state spaces which are hierarchically divided from a top node (a start node or a root node) to a lowest terminal node (a terminal node or a leaf node) in a tree shape or a in a grid shape. Note that this drawing illustrates an example of a case where d is 2 and n is 2 in a learning tree of N layers, d dimensions and n divisions, and numbers of 1 to 4 provided to four terminal nodes in the first layer of the learning tree illustrated in FIG. 12(a) respectively correspond to four state spaces illustrated in FIG. 12(b).

In a case where learning processing is performed using the above-described learning tree, input data is sequentially made to correspond to each divided state space and accumulated in each state space. In this event, in a case where new data is input in a state space in which data has not existed so far, new nodes are sequentially generated. A predicted output is calculated by calculating an arithmetic average of output values or output vectors corresponding to respective pieces of data included in the respective state spaces after learning.

According to such a machine learning technique, it is possible to implement memory efficient high-speed machine learning.

CITATION LIST

Patent Literature

Patent Literature 1: Japanese Patent Laid-Open No. 2016-173686

SUMMARY

Technical Problem

By the way, it is typical in feedback control in related art including PID control to adjust and set a gain before control is started and use the fixed gain after control is started. Thus, for example, in a case where characteristics of a control target or an operator change due to degradation over time, or the like, an adaptive response cannot be taken, which may lower accuracy of the control.

The present disclosure has been made under the above-described technical background, and an object of the present disclosure is to perform adaptive control on the basis of data obtained during control while utilizing reliable feedback control which has been utilized for many years.

Further other objects and operational effects of the present disclosure will be easily understood by a person skilled in the art by referring to the following description of the specification.

Solution to Problem

The above-described technical problem can be solved by a control device having the following configuration, a method, a program, a system, or the like.

In other words, a control device according to the present disclosure is a control device for performing feedback control on a predetermined device, the control device including a first controller configured to generate a first operation amount for the device on the basis of an output fed back from the device and a target value, a predicted output generation unit including a learned model which is machine learned so as to generate a predicted output from the device on the basis of the output fed back from the device and the first operation amount, a second controller configured to generate a second operation amount for the device on the basis of the predicted output and the target value, an integrated operation amount generation unit configured to generate an integrated operation amount which is an operation amount for the device on the basis of the first operation amount and the second operation amount, and a storage unit configured to, in a case where the second operation amount is subjected to invalidation processing, store the first operation amount, the output fed back from the device and an output from the device corresponding to the integrated operation amount as machine learning data.

According to such a configuration, it is possible to perform adaptive control on the basis of data obtained during control by a machine learning technique while utilizing feedback control which is a reliable control technique utilized for many years.

The control device may further include a learning processing unit configured to perform learning processing on the basis of the machine learning data and update the learned model.

According to such a configuration, it is possible to optimize control by performing learning processing while controlling the device.

The control device may further include a determination unit configured to determine whether or not the second operation amount satisfies an invalidation condition, and an invalidation processing unit configured to perform processing of invalidating the second operation amount in a case where it is determined at the determination unit that the second operation amount satisfies the invalidation condition.

According to such a configuration, in a case where the second operation amount satisfies a condition determined in advance, the second operation amount is invalidated, and only control based on the first operation amount is performed, so that more reliable control can be performed. Further, data in the period can be provided as machine learning data, so that improvement in control accuracy can be expected in the future.

The invalidation condition may be a condition that the second operation amount is greater than a first threshold or smaller than a second threshold which is smaller than the first threshold.

According to such a configuration, the second operation amount is invalidated in a case where the operation amount exceeds an expected amount, so that more reliable control can be performed. Further, data in the period can be provided as machine learning data, so that improvement in control accuracy can be expected in the future.

The storage unit may further store the first operation amount, the output fed back from the device and the output from the device corresponding to the integrated operation amount as machine learning data in a case where the second operation amount is 0 or a value close to 0.

According to such a configuration, learning can be pursued by utilizing also a case where the second operation amount is 0 or a value close to 0, so that further improvement in control accuracy can be expected.

The storage unit may further store as the machine learning data, the first operation amount relating to one or a plurality of time steps temporally before a reference time step, the output fed back from the device and the output from the device corresponding to the integrated operation amount in addition to the first operation amount relating to the reference time step in a case where the second operation amount is subjected to invalidation processing, the output fed back from the device, and the output from the device corresponding to the integrated operation amount.

According to such a configuration, data relating to one or more time steps before the reference time step is also learned together, and thus, generalization becomes easier, so that improvement in learning speed can be expected.

Each of the first controller and/or the second controller may perform one of P control, PI control, PD control or PID control.

According to such a configuration, it is possible to further improve control accuracy on the basis of data obtained during operation of the device by a machine learning technique while utilizing a reliable control technique which has been utilized for many years.

The learned model may be a model which is obtained by performing machine learning using a learning model having a tree structure constituted by hierarchically disposing a plurality of nodes respectively associated with state spaces which are hierarchically divided.

Such a configuration enables high-speed learning while saving a memory compared to learning for an artificial neural network, or the like, and thus, is particularly advantageous in a case where simultaneous learning (online learning) is performed while the device is made to operate.

The present disclosure can be implemented as a method. In other words, a control method according to the present disclosure is a control method at a control device for performing feedback control on a predetermined device, the control device including a first controller configured to generate a first operation amount for the device on the basis of an output fed back from the device and a target value, a predicted output generation unit including a learned model which is machine learned so as to generate a predicted output from the device on the basis of the output fed back from the device and the first operation amount, and a second controller configured to generate a second operation amount for the device on the basis of the predicted output and the target value, and the control method including an integrated operation amount generation step of generating an integrated operation amount which is an operation amount for the device on the basis of the first operation amount and the second operation amount, and a storage step of, in a case where the second operation amount is subjected to invalidation processing, storing the first operation amount, the output fed back from the device and an output from the device corresponding to the integrated operation amount as machine learning data.

The present disclosure can be implemented as a program. In other words, a control program according to the present disclosure is a control program of a control device for performing feedback control on a predetermined device, the control device including a first controller configured to generate a first operation amount for the device on the basis of an output fed back from the device and a target value, a predicted output generation unit including a learned model which is machine learned so as to generate a predicted output from the device on the basis of the output fed back from the device and the first operation amount, and a second controller configured to generate a second operation amount for the device on the basis of the predicted output and the target value, and the control program including an integrated operation amount generation step of generating an integrated operation amount which is an operation amount for the device on the basis of the first operation amount and the second operation amount, and a storage step of, in a case where the second operation amount is subjected to invalidation processing, storing the first operation amount, the output fed back from the device and an output from the device corresponding to the integrated operation amount as machine learning data.

The present disclosure can be implemented as a system. In other words, a control system according to the present disclosure is a control system for performing feedback control on a predetermined device, the control system including a first controller configured to generate a first operation amount for the device on the basis of an output fed back from the device and a target value, a predicted output generation unit including a learned model which is machine learned so as to generate a predicted output from the device on the basis of the output fed back from the device and the first operation amount, a second controller configured to generate a second operation amount for the device on the basis of the predicted output and the target value, an integrated operation amount generation unit configured to generate an integrated operation amount which is an operation amount for the device on the basis of the first operation amount and the second operation amount, and a storage unit configured to, in a case where the second operation amount is subjected to invalidation processing, store the first operation amount, the output fed back from the device, and an output from the device corresponding to the integrated operation amount as machine learning data.

Advantageous Effects

According to the present disclosure it is possible to perform adaptive control on the basis of data obtained during control while utilizing reliable feedback control.

DESCRIPTION OF EMBODIMENTS

One embodiment of the present disclosure will be described in detail below with reference to the accompanying drawings.

1. First Embodiment

Figure 1:
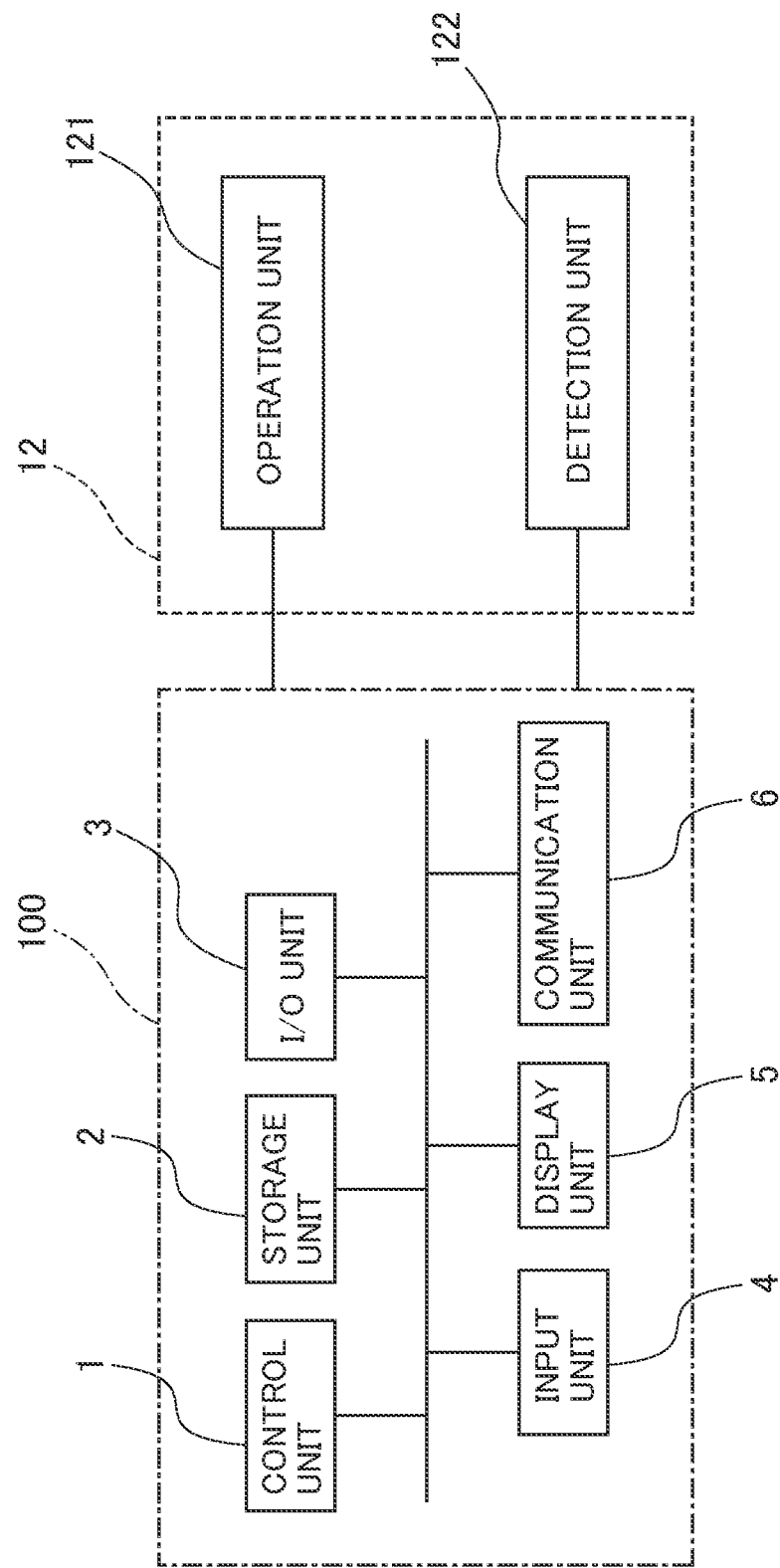
FIG. 1 is a hardware configuration diagram of a control system.

<1.1 Configuration>
FIG. 1 is a hardware configuration diagram of a control system including a control device 100 and a control mechanism 12.

As can be clear from the drawing, the control device 100 includes a control unit 1, a storage unit 2, an I/O unit 3, an input unit 4, a display unit 5 and a communication unit 6, which are connected to one another via a bus. Further, the control device 100 is connected to an operation unit 121 and a detection unit 122 which constitute the control mechanism 12 and can control a control target which is not illustrated.

The control unit 1, which is an information processing unit such as a CPU, reads out and executes various kinds of programs stored in the storage unit 2. The storage unit 2, which is a volatile or non-volatile storage device such as a ROM, a RAM, a hard disk and a flash memory, stores various kinds of data which will be described later including data to be machine learned. The I/O unit 3 is an interface that performs input and output to and from an external device. The input unit 4 processes a signal input via a keyboard, a touch panel, a button, or the like. The display unit 5 is connected to a display, or the like, performs display control and provides a GUI to a user via the display, or the like. The communication unit 6 is a communication unit that performs communication with external equipment in a wired or wireless manner.

The operation unit 121, which affects a control target on the basis of a predetermined operation amount, is, for example, constituted with an actuator, or the like. The detection unit 122, which detects a state, or the like, of the control target, is, for example, constituted with a sensor, or the like.

Note that a hardware configuration is not limited to a configuration according to the present embodiment, and components and functions may be distributed or integrated. For example, processing may be performed in a distributed manner using a plurality of control devices 100, or a mass storage device may be further externally provided and connected to the control device 100. Alternatively, processing may be performed by forming a computer network via the Internet, or the like.

Further, processing according to the present embodiment may be implemented as so-called a hardware using a semiconductor circuit (such as an IC) such as an FPGA.

<1.2 Operation>
Operation of the control device 100 will be described next with reference to FIG. 2 to FIG. 10.

Figure 2:
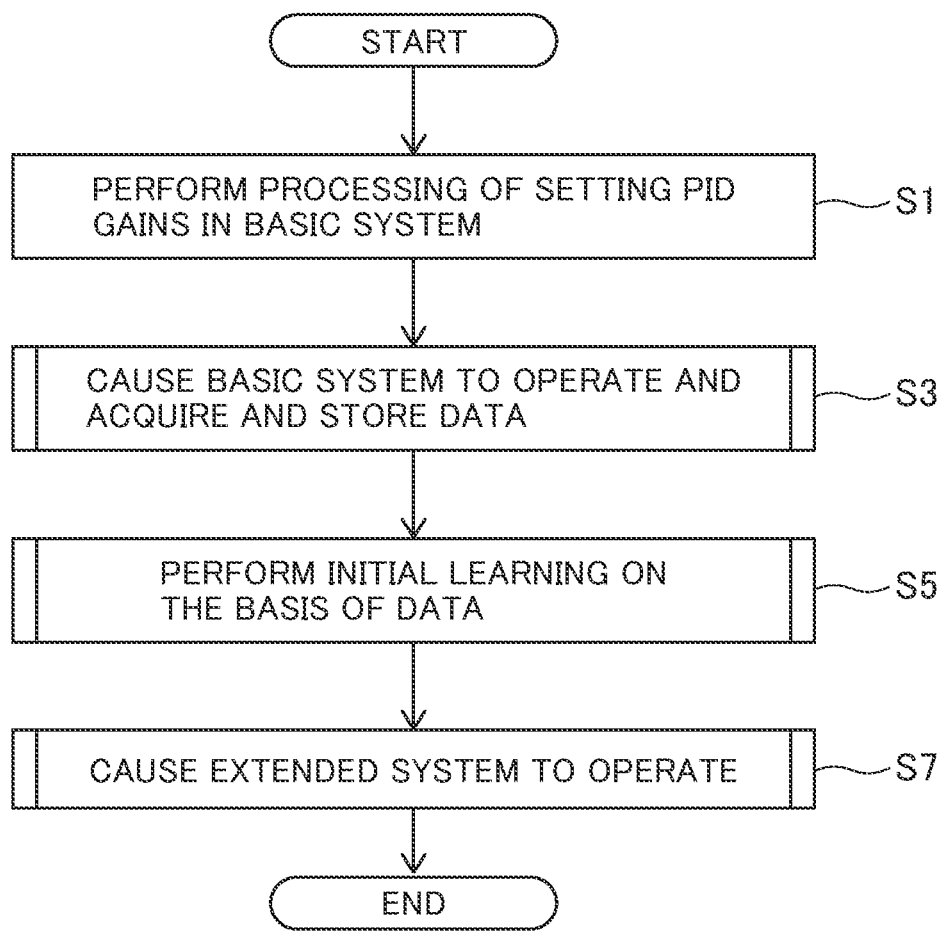
FIG. 2 is a general flowchart regarding operation of a system.

FIG. 2 is a general flowchart regarding the operation of the control device 100.

As can be clear from the drawing, if processing is started, processing of setting respective gains (that is, a P (proportional) gain, an I (integral) gain), a D (derivative) gain) to be set at a first PID controller 11 of a basic system 10 which will be described later is performed (S1).

Figure 3:
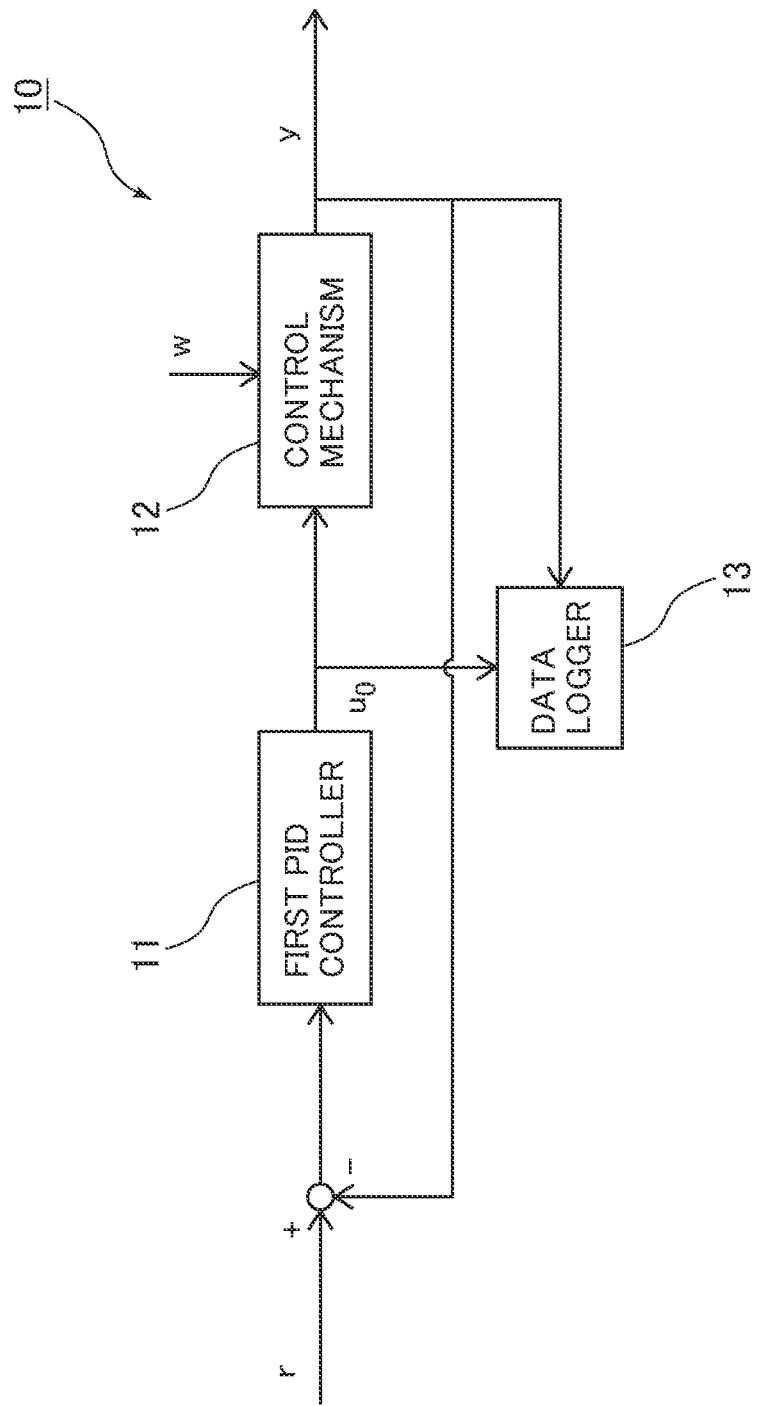
FIG. 3 is a block diagram regarding a basic system.
Figure 11:
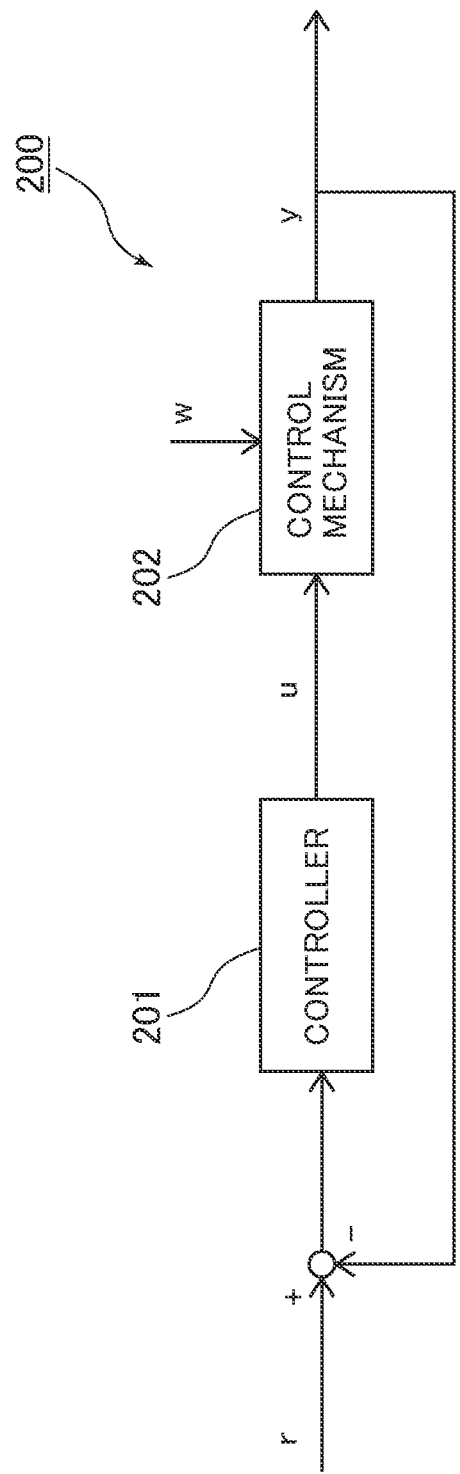
FIG. 11 is a block diagram regarding a basic configuration of a feedback system.

FIG. 3 is a block diagram regarding the basic system 10. As can be clear from the drawing, the basic system 10 includes the first PID controller 11, the control mechanism 12 which is provided in a subsequent stage of the first PID controller 11 and which includes the operation unit 121 and the detection unit 122, and a data logger 13 that records an operation amount $u_0$ output from the first PID controller and an output value y output from the detection unit 122 of the control mechanism 12. Note that while the operation is substantially the same as operation of the feedback system 200 illustrated in FIG. 11, the operation is different in that the data logger 13 records the operation amount $u_0$ output from the first PID controller and the output value y output from the detection unit 122 of the control mechanism 12.

The user adjusts respective gains of the first PID controller 11 using a publicly known method by causing the basic system 10 to operate or performing simulation, or the like, and inputs final gains via the input unit 4, or the like, to set the gains. The input respective gains are stored in the storage unit 2.

Returning to FIG. 2, if the processing of setting gains (S1) is completed, processing of causing the basic system 10 to actually operate by utilizing the gains, that is, processing of acquiring and storing machine learning data is performed (S3).

Figure 4:
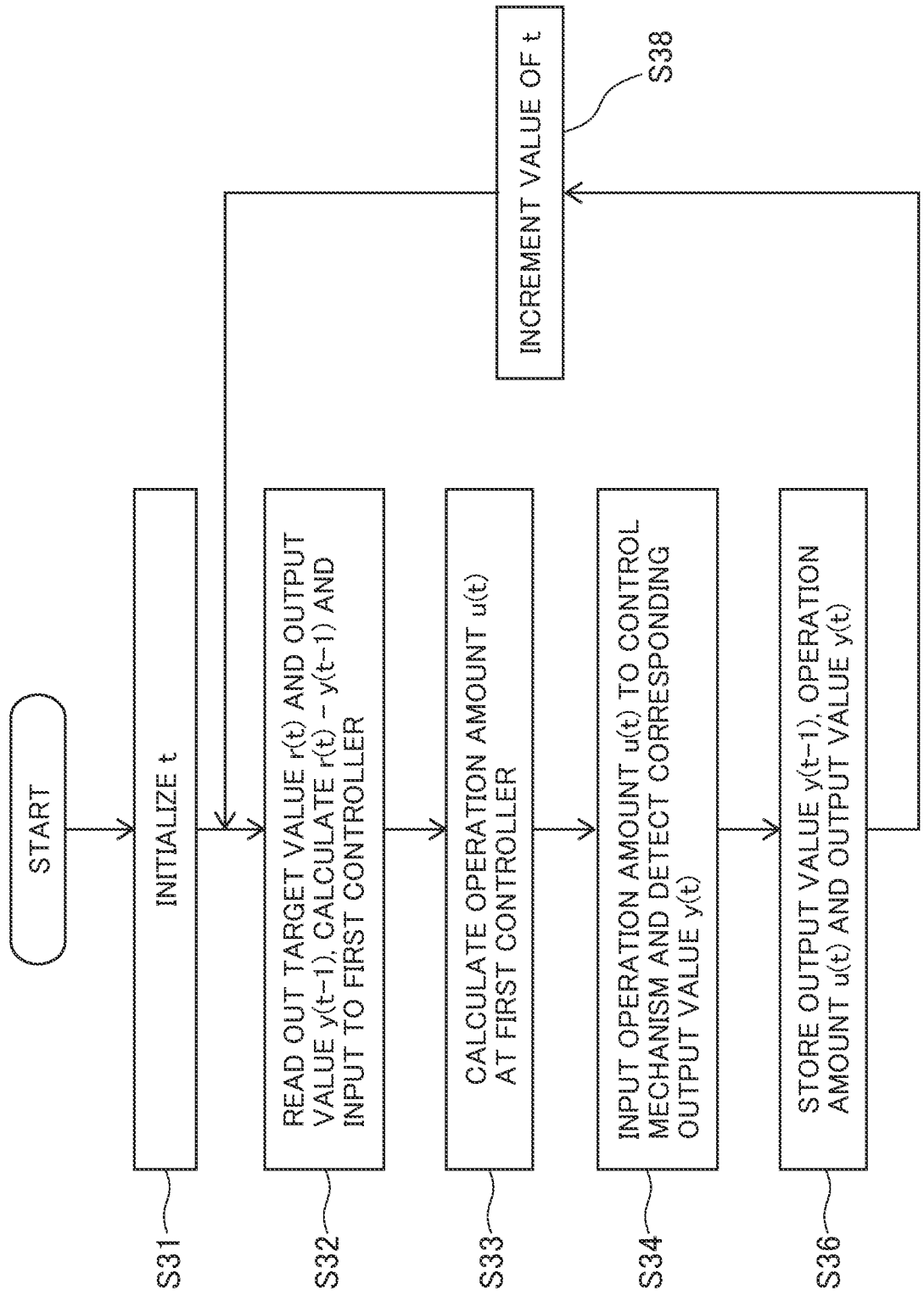
FIG. 4 is a detailed flowchart regarding operation of the basis system.

FIG. 4 is a detailed flowchart regarding operation of the basic system 10. As can be clear from the drawing, if the processing is started, processing of initializing a predetermined integer value t corresponding to a time step (for example, at 1) is performed (S31). If initialization is completed, processing of reading out a predetermined target value r(t) and an output value y(t−1) of a previous time step (t−1), calculating deviation (r(t)−y(t−1)) and inputting the deviation to the first controller 11 is performed (S32).

If the deviation is input, the first controller 11 calculates an operation amount u(t) on the basis of the set gains (S33). This operation amount u(t) is provided to the operation unit 121 of the control mechanism 12, and thereby, predetermined control is performed on the control target. Then, a current (t) output value y(t) is detected via the detection unit 122 of the control mechanism 12 (S34).

If a series of processing described above is finished, processing of storing the output value y(t−1) of the previous time step, the operation amount u(t) and the output value y(t) of the current time (t) in the storage unit 2 via the data logger 13 is performed (S36). Then, a value of t is incremented by 1 (S38), and a series of processing (S32 to S38) is performed again.

In other words, processing of storing the output value y(t−1) of the previous time step, the operation amount u(t) and the output value y(t) of the current time in the storage unit 2 via the data logger 13 is continuously performed while the control target is controlled. By this means, a desired amount of machine learning data for generating a learned model which is to be used at a prediction processing unit 35 which will be described later is accumulated.

Returning to FIG. 2, if processing of acquiring and storing data is completed on the basis of the operation of the basic system 10 (S3), processing of performing initial learning on the basis of the obtained data is performed (S5).

Figure 5:
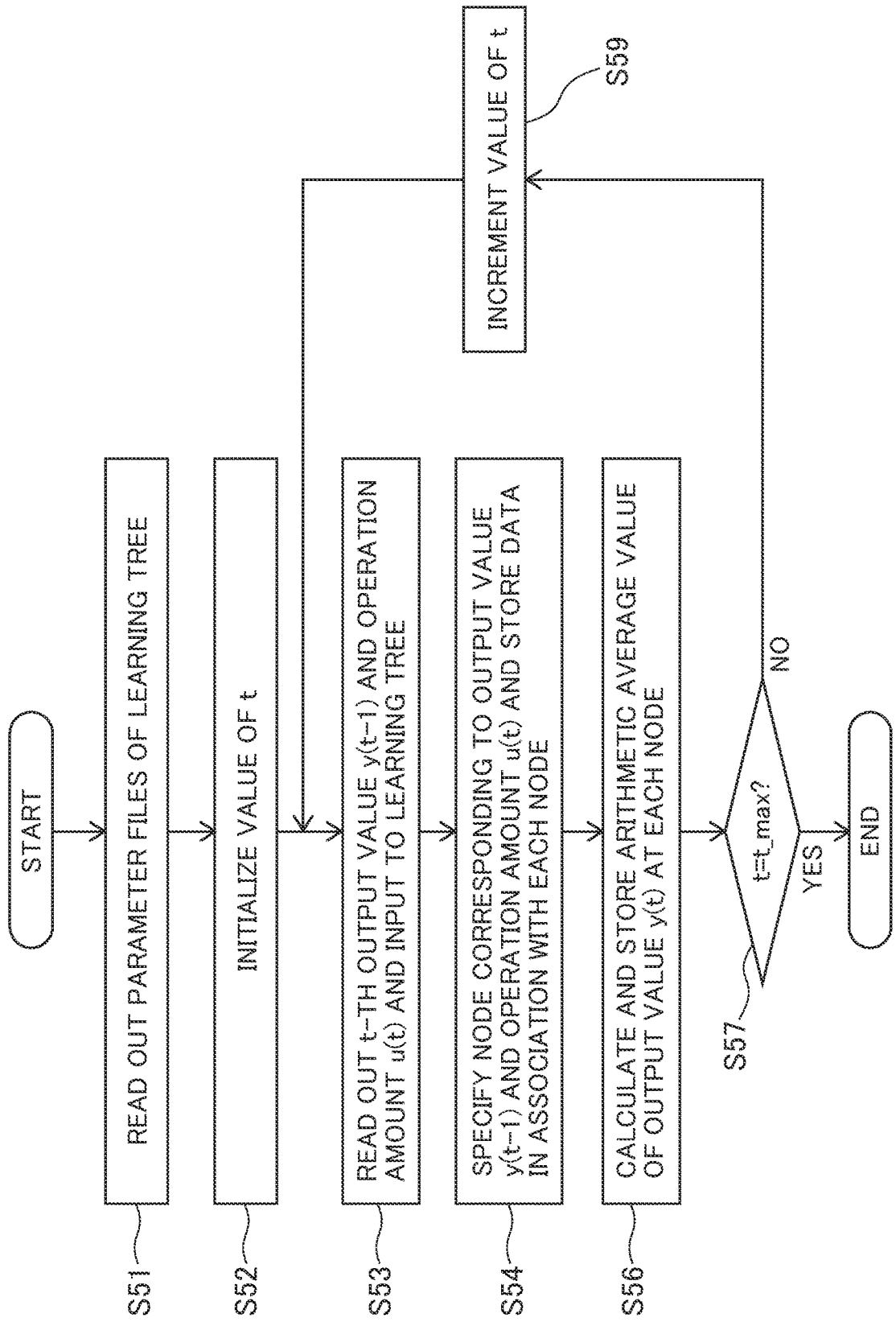
FIG. 5 is a detailed flowchart regarding initial learning.
Figure 12:
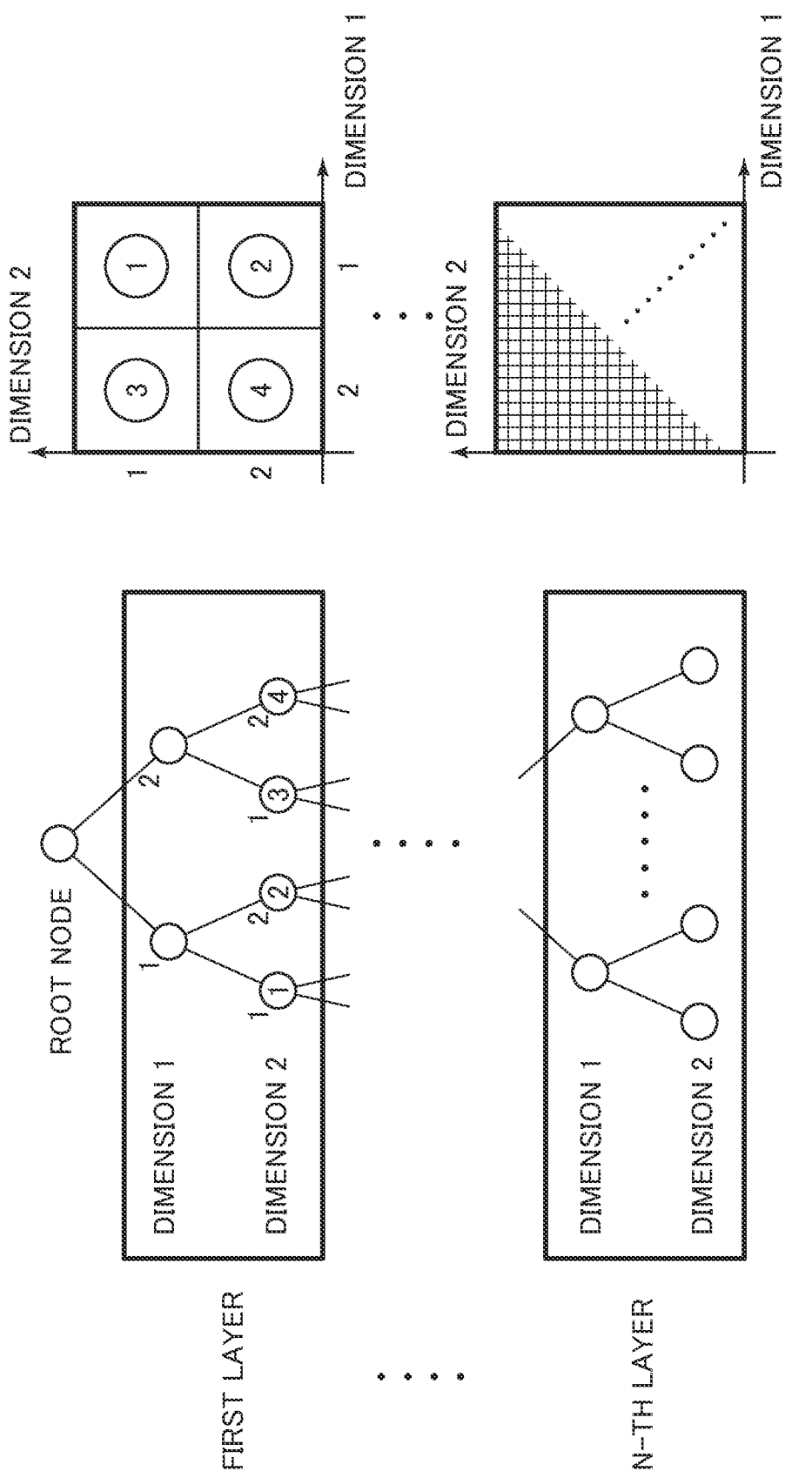
FIG. 12 is an explanatory diagram regarding a learning tree.

FIG. 5 is a detailed flowchart regarding initial learning. In the present embodiment, the machine learning technique utilizing the tree structure described above with FIG. 12 is used as the machine learning technique.

As can be clear from the drawing, if the processing is started, processing of reading out parameter files regarding learning including a structure of a learning tree (such as the number of layers, the number of dimensions and the number of divisions) and various initial parameters from the storage unit 2 is performed. Then, processing of initializing a predetermined integer value t (for example, at 1) is performed (S52).

After this initialization, processing of reading out t-th input data, that is, the output value y(t−1) of the previous time step and the operation amount u(t) and inputting the t-th input data to the learning tree is performed (S53). Then, the input is classified in accordance with a predetermined branch condition, a plurality of nodes from a root node to a leaf node are specified, and the input is stored in association with the respective nodes (S54).

Then, processing of calculating an arithmetic average value from values including a new output value y(t) so as to update the arithmetic average value so far based on the output value y and storing the arithmetic average value in association with the nodes is performed at the respective nodes (S56).

Then, it is determined whether the value of t matches a predetermined maximum value (t_max), and in a case where the value of t is not yet the maximum value (S57: No), the value of t is incremented by 1, and the above-described learning processing (S53 to S56) is repeated again. On the other hand, in a case where the value of t becomes the predetermined maximum value (S57: Yes), the processing is finished.

In other words, as a result of this, a learned model which predicts the output value y(t) is generated on the basis of the output value y(t−1) of the previous time step and the operation amount u(t) of the current time.

Returning to FIG. 2, if the initial learning processing is completed, the extended system 30 which will be described later and which is obtained by extending the basic system 10 is then caused to operate (S7).

Figure 6:
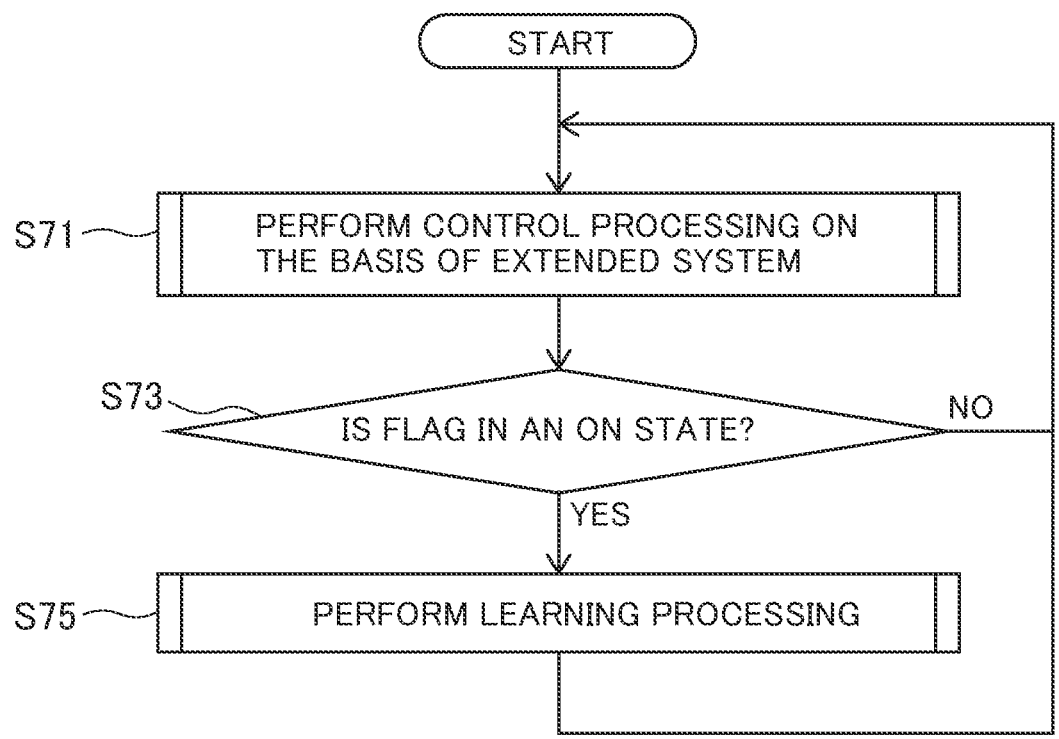
FIG. 6 is a detailed flowchart regarding operation of an extended system.

FIG. 6 is a detailed flowchart regarding operation of the extended system 30. As can be clear from the drawing, if the processing is started, control processing based on the extended system 30 is performed (S71).

Figure 7:
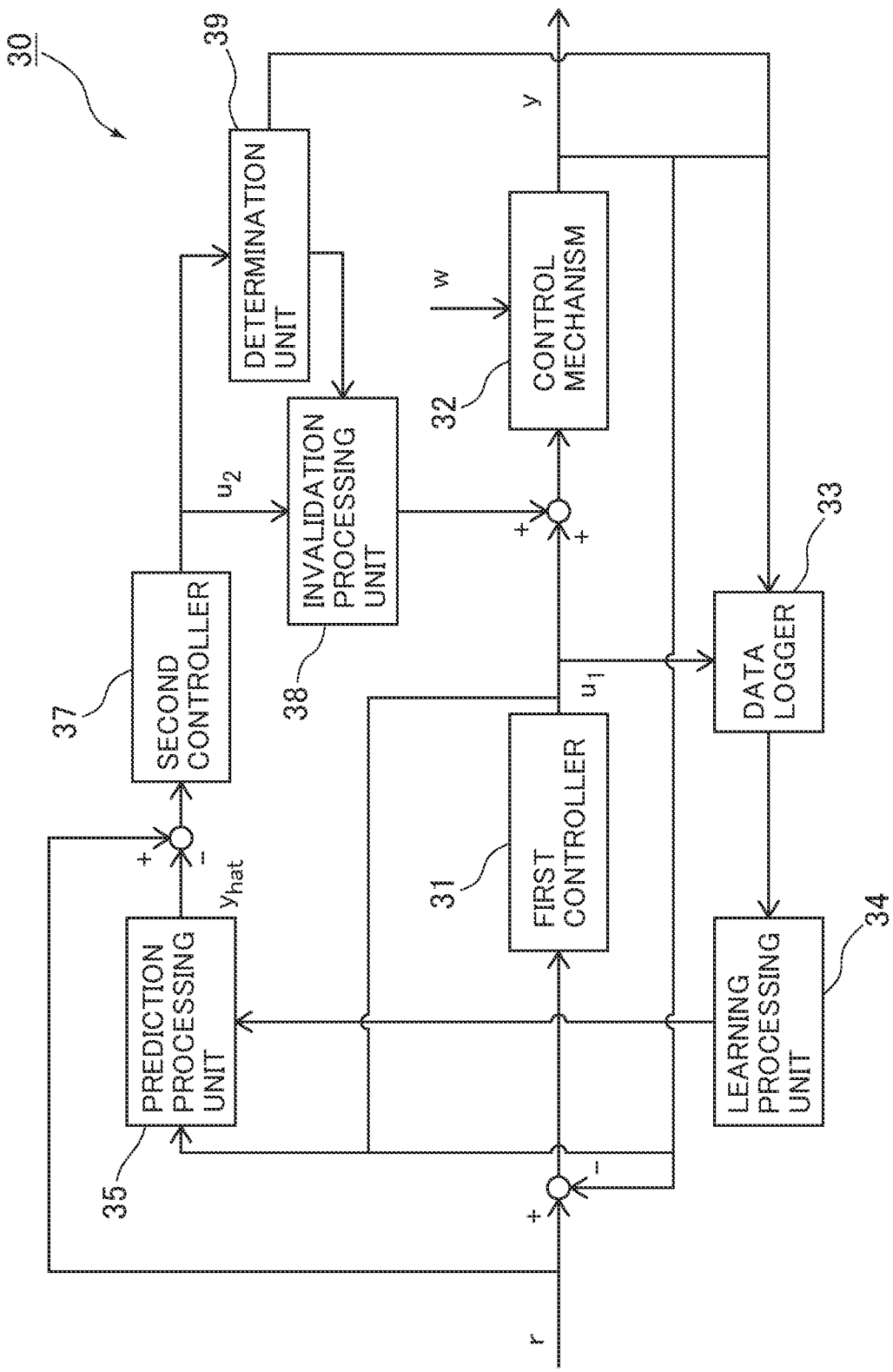
FIG. 7 is a block diagram regarding the extended system.

FIG. 7 is a block diagram of the extended system 30. As can be clear from the drawing, the extended system 30 further includes a second feedback loop and a learning processing unit 34 in addition to the components of the basic system 10 including a first feedback loop. The second feedback loop includes the prediction processing unit 35 including a learned model, a second controller 37 which is provided in the subsequent stage of the prediction processing unit 35, and an invalidation processing unit 38 and a determination unit 39 which are provided in the further subsequent stage of the second controller 37.

The prediction processing unit 35 includes a learned model that generates a predicted output value $y_{hat}(t)$ on the basis of the output value y(t−1) of the previous time step and the first operation amount $u_1(t)$ of the current time. Further, the second controller 37 generates a second operation amount $u_2(t)$ on the basis of deviation $(r(t)-y_{hat}(t))$ between the target value r(t) and the predicted output value $y_{hat}(t)$. The determination unit 39 performs predetermined conditional determination regarding the second operation amount $u_2(t)$ and provides a determination result to the invalidation processing unit 38. The invalidation processing unit 38 invalidates the second operation amount $u_2(t)$ (for example, sets the second operation amount $u_2(t)$ at 0) or provides the second operation amount $u_2(t)$ as is in accordance with the determination result provided from the determination unit 39.

Further, the learning processing unit 34 reads out the data stored in the storage unit 2 through the data logger 53, performs learning processing under a predetermined condition and provides the updated learned model to the prediction processing unit 35.

Figure 8:
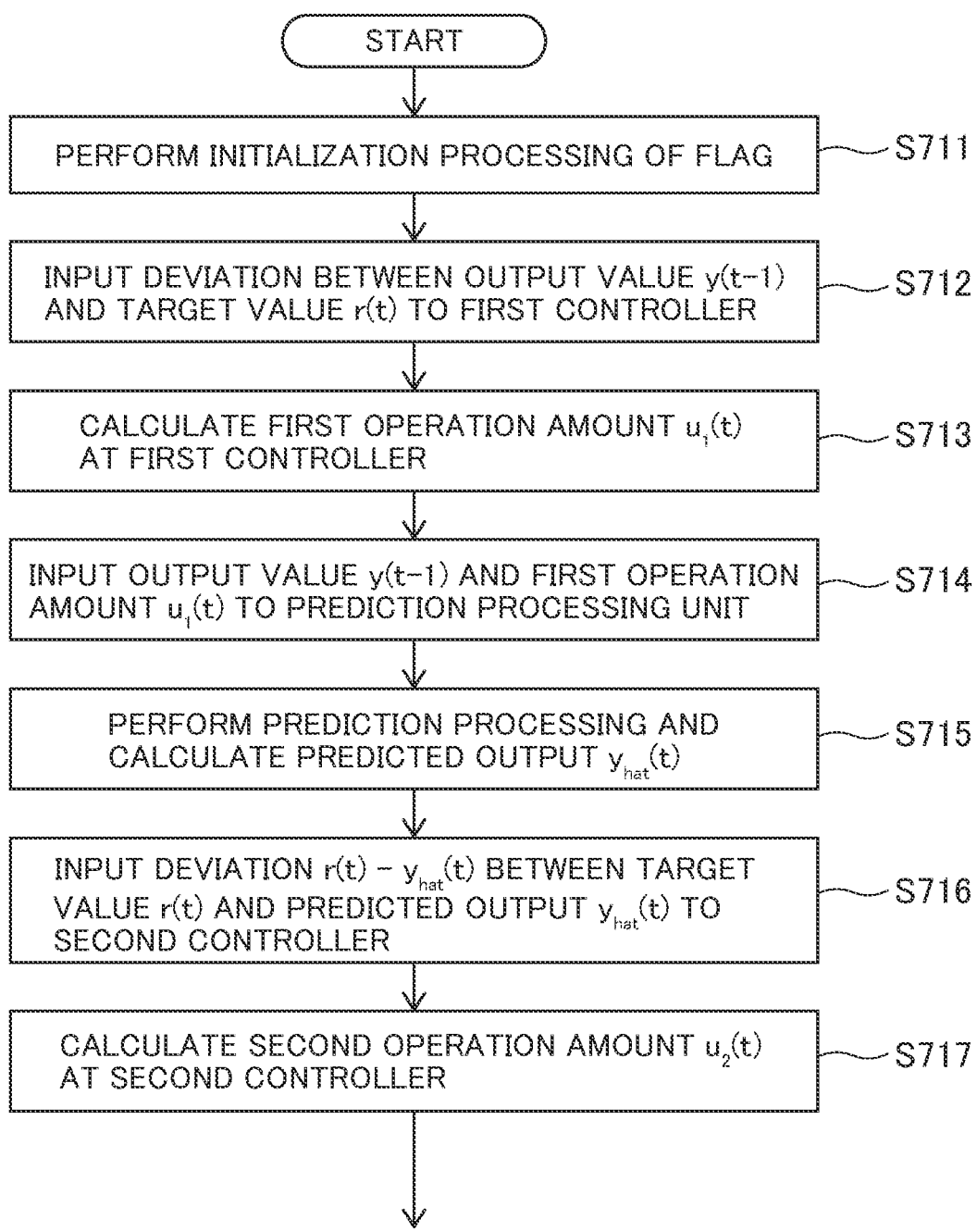
FIG. 8 is a detailed flowchart (No. 1) regarding control processing in the extended system.
Figure 9:
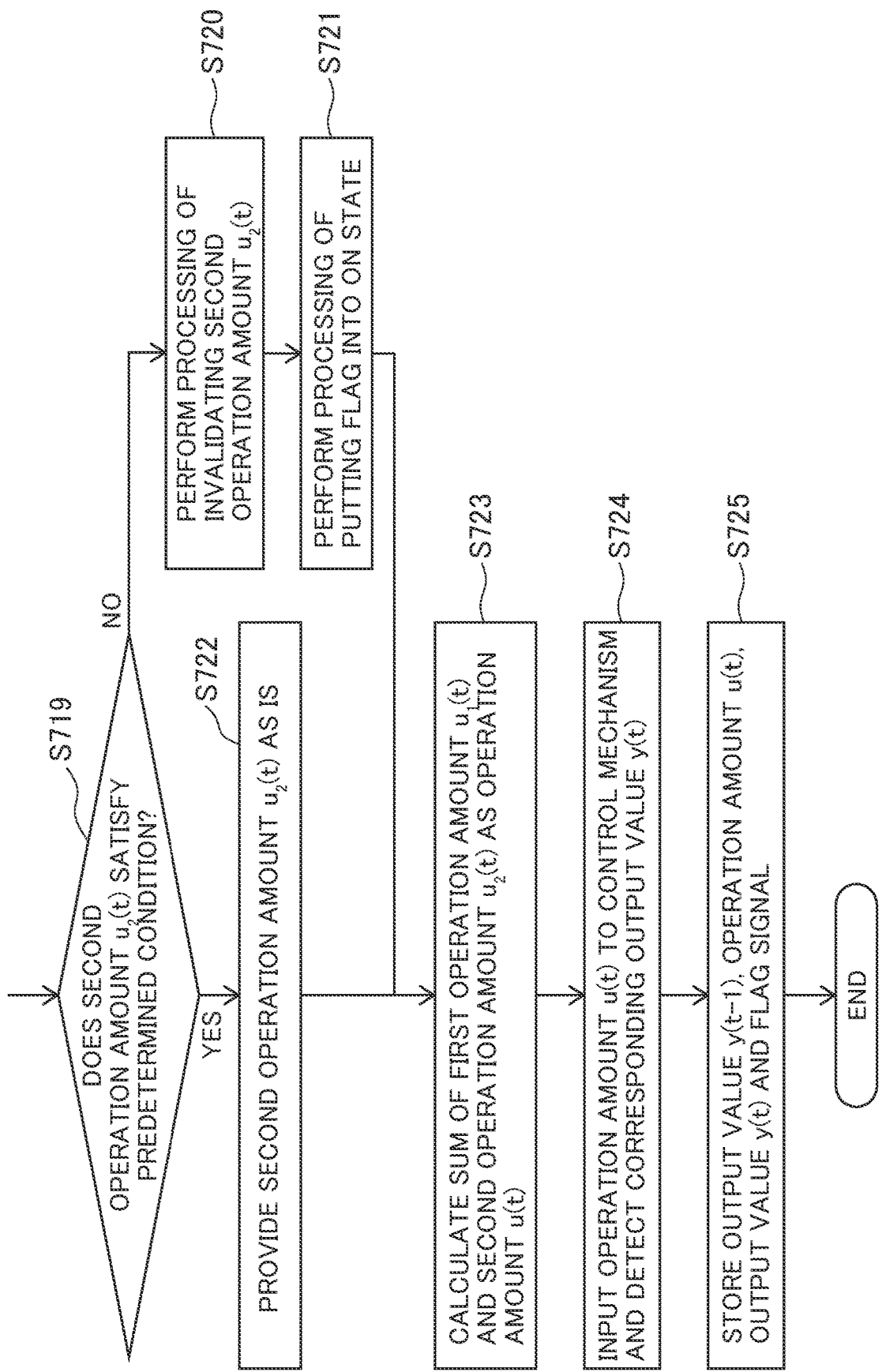
FIG. 9 is a detailed flowchart (No. 2) regarding the control processing in the extended system.

FIG. 8 and FIG. 9 are detailed flowcharts regarding control processing in the extended system 30.

In FIG. 8, if the processing is started, processing of initializing a flag to be used at processing which will be described later is performed (S711). Then, processing of inputting deviation (r(t)−y(t−1)) between the output value y(t−1) of the previous time step and the target value r(t) to the first controller 31 is performed (S712). The first controller 31 performs processing of calculating the first operation amount $u_1(t)$ on the basis of the input and the set gains (S713).

Then, processing of inputting the first operation amount $u_1(t)$ and the output value y(t−1) of the previous time step to the prediction processing unit 35 is performed (S714). The prediction processing unit 35 calculates a predicted output $y_{hat}(t)$ by inputting the first operation amount $u_1(t)$ and the output value y(t−1) of the previous time step to the learned model (S715). After this calculation, processing of inputting deviation $(r(t)-y_{hat}(t))$ between the predicted output $y_{hat}(t)$ and the target value r(t) to the second controller 37 is performed (S716). The second controller 37 calculates the second operation amount $u_2(t)$ on the basis of the deviation between the predicted output $y_{hat}(t)$ and the target value r(t) (S717).

Continuous with FIG. 9, if the second operation amount $u_2(t)$ is calculated, processing of determining whether or not the second operation amount $u_2(t)$ satisfies a predetermined condition is performed by the determination unit 39 (S719).

Figure 10:
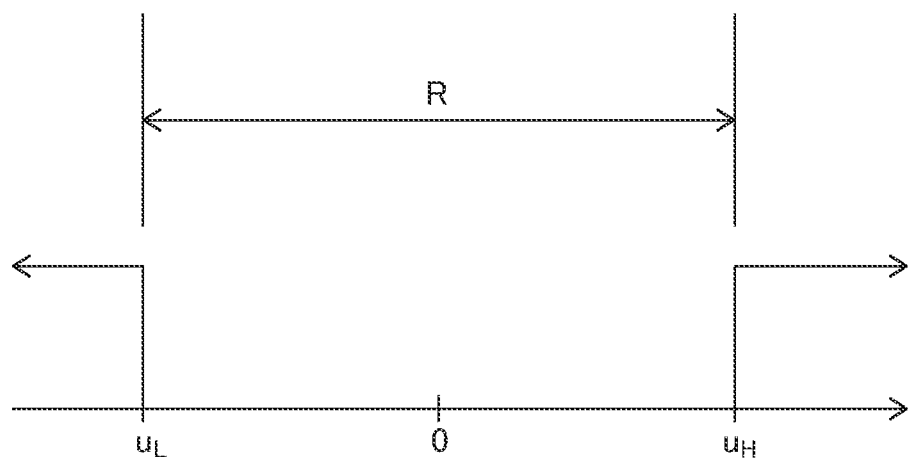
FIG. 10 is an explanatory diagram regarding a condition of a second operation amount.

FIG. 10 is an explanatory diagram regarding outline of the predetermined condition of the second operation amount $u_2(t)$. As can be clear from the drawing, the predetermined condition is a condition that whether or not the second operation amount $u_2(t)$ falls within a range (range indicated with R in the drawing) equal to or greater than a predetermined threshold $U_L$ and equal to or less than a predetermined threshold $U_H$.

In a case where the second operation amount $u_2(t)$ does not fall within this range (R) (S719: No), that is, the second operation amount $u_2(t)$ is smaller than the predetermined threshold $U_L$ or greater than the predetermined threshold $U_H$, the determination unit 39 provides a determination signal indicating that the second operation amount $u_2(t)$ does not fall within the predetermined range to the invalidation processing unit 38, and the invalidation processing unit 38 performs processing of invalidating the second operation amount $u_2(t)$ (S720). After this invalidation processing, processing of putting a flag into an ON state which means that invalidation has been performed, is performed (S721).

On the other hand, in a case where the second operation amount $u_2(t)$ falls within the above-described range (R) (S719: Yes), the determination unit 39 provides a determination signal indicating that the second operation amount $u_2(t)$ falls within the predetermined range to the invalidation processing unit 38, and the invalidation processing unit 38 provides the second operation amount $u_2(t)$ as is to a subsequent stage of output of the first controller 31 of the first feedback loop (S722).

Then, processing of adding the first operation amount $u_1(t)$ and the second operation amount $u_2(t)$ to calculate the operation amount u(t) is performed at the subsequent stage of output of the first controller 31 of the first feedback loop (S723). This operation amount u(t) is input to the operation unit 121 of a control mechanism 32, and an output value y(t) as a result is detected through the detection unit 122 (S724).

After this detection processing, processing of storing the output value y(t−1) of the previous time step, the operation amount u(t), the output value y(t) and a flag signal is performed (S725), and processing corresponding to one cycle of the control processing in the extended system 30 is finished.

Returning to FIG. 6, if the processing corresponding to one cycle of the control processing in the extended system 30 is finished, processing of determining a state of the stored flag is performed (S73). In a case where it is determined that the flag is in an OFF state (S73: No), processing in the next time step in the extended system 30 is performed again (S71). On the other hand, in a case where it is determined that the flag is in an ON state (S73: Yes), that is, in a case where processing of invalidating the second operation amount $u_2(t)$ is performed, learning processing is performed (S75).

Content of the learning processing (S75) is substantially the same as the processing illustrated in FIG. 5, and thus, description will be omitted here. After this learning processing, processing in the next time step in the extended system 30 is performed again (S71).

According to such a configuration, it is possible to perform adaptive control on the basis of data obtained during control by a machine learning technique while utilizing feedback control which is a reliable control technique which has been utilized for many years.

Further, according to such a configuration, in a case where the second operation amount $u_2(t)$ satisfies the condition determined in advance, the second operation amount $u_2(t)$ is invalidated, and only control based on the first operation amount $u_1(t)$ is performed, so that it is possible to perform reliable control. Further, data in the period is provided as machine learning data, so that improvement in control accuracy can be expected in the future.

2. Modified Example

The above-described embodiment is an illustrative embodiment, and various modifications can be made to the present disclosure.

While in the above-described embodiment, a PID controller is described as an example of a controller, the present disclosure is not limited to such a configuration. Thus, other controllers having the same type of functions may be used, or for example, control utilizing only part of gains, such as P control, PI and PD control may be utilized.

While the above-described embodiment has a configuration (online learning) in which learning processing is performed in real time in each case while the state of the flag is confirmed for each time step, the present disclosure is not limited to such a configuration. Thus, for example, learning (batch learning, mini-batch learning) may be performed in a batch manner after waiting until a certain amount of data to be learned is accumulated.

While the above-described embodiment has a configuration in which data relating to the previous one step is learned in a case where the flag is in an ON state (S721), the present disclosure is not limited to such a configuration. Thus, for example, learning (S75) may be performed by also utilizing data of one or a plurality of steps leading to the one step. Such learning can be effective particularly in a case where a learning target is continuous.

While the above-described embodiment has a configuration in which learning (S75) is performed while the flag is put into an ON state in a case where the second operation amount $u_2(t)$ deviates from the predetermined range (the region indicated with "R" in FIG. 10) because the invalidation processing (S720) is performed in a case where the second operation amount $u_2(t)$ deviates from the region (R) (S719: No). However, the present disclosure is not limited to such a configuration. Thus, for example, learning (S75) may be performed in a case where the second operation amount $u_2(t)$ is 0 or a value close to 0 (a range of 0±ε) (ε is a minute value) regardless of whether or not the second operation amount $u_2(t)$ falls within the predetermined range (R). Note that in this event, this minute value ε may be able to be arbitrarily set by the user.

While in the above-described embodiment, a machine learning model based on a tree structure model is utilized, the present disclosure is not limited to such a configuration. Thus, for example, other machine learning models such as a neural network and support vector machine may be utilized.

INDUSTRIAL APPLICABILITY

The present disclosure can be utilized in various industries, or the like, which utilize a control device.

REFERENCE SIGNS LIST 1 control unit
2 storage unit
3 I/O unit 4 input unit
5 display unit
6 communication unit
10 basic system
11 first PID controller
12 control mechanism
100 control device
121 operation unit
122 detection unit
13 data logger
30 extended system
31 first controller
32 control mechanism
33 data logger
34 learning processing unit
35 prediction processing unit
37 second controller
38 invalidation processing unit
39 determination unit
200 feedback system
201 controller
202 control mechanism

The invention claimed is:

1. A control device configured to perform feedback control on a predetermined device, the control device comprising:
a first controller configured to generate a first operation amount for the device on a basis of an output fed back from the device and a target value;
a predicted output generator including a learned model which is machine learned so as to generate a predicted output from the device on a basis of the output fed back from the device and the first operation amount;
a second controller configured to generate a second operation amount for the device on a basis of the predicted output and the target value;
processor circuitry configured to generate an integrated operation amount which is an operation amount for the device on a basis of the first operation amount and the second operation amount; and
a storage configured to, in a case where the second operation amount is subjected to invalidation processing, store the first operation amount, the output fed back from the device and an output from the device corresponding to the integrated operation amount as machine learning data, and
wherein the first controller is configured to perform one of P control, PI control, PD control or PID control thereby providing the first operation amount, and
wherein the second controller is configured to perform one of P control, PI control, PD control or PID control thereby providing the second operation amount.

2. The control device according to claim 1, further comprising:
learning processor circuitry configured to perform learning processing on a basis of the machine learning data and update the learned model.

3. The control device according to claim 1, further comprising:
determination processor circuitry configured to determine whether or not the second operation amount satisfies an invalidation condition; and
invalidation processor circuitry configured to perform processing of invalidating the second operation amount in a case where it is determined at the determination processor circuitry that the second operation amount satisfies the invalidation condition.

4. The control device according to claim 3,
wherein the invalidation condition is a condition that the second operation amount is greater than a first threshold or smaller than a second threshold which is smaller than the first threshold.

5. The control device according to claim 1,
wherein the storage is further configured to store the first operation amount, the output fed back from the device, and the output from the device corresponding to the integrated operation amount as machine learning data in a case where the second operation amount is 0 or a value close to 0.

6. The control device according to claim 1,
wherein the storage is further configured to store as machine learning data, the first operation amount relating to one or a plurality of time steps temporally before a reference time step, the output fed back from the device, and the output from the device corresponding to the integrated operation amount in addition to the first operation amount relating to the reference time step in a case where the second operation amount is subjected to invalidation processing, the output fed back from the device and the output from the device corresponding to the integrated operation amount.

7. The control device according to claim 1,
wherein the learned model is a model which is obtained by performing machine learning using a learning model comprising a tree structure constituted by hierarchically disposing a plurality of nodes respectively associated with state spaces which are hierarchically divided.

8. A control method at a control device configured to perform feedback control on a predetermined device,
the control device comprising:
a first controller configured to generate a first operation amount for the device on a basis of an output fed back from the device and a target value;
a predicted output generator including a learned model which is machine learned so as to generate a predicted output from the device on a basis of the output fed back from the device and the first operation amount; and
a second controller configured to generate a second operation amount for the device on a basis of the predicted output and the target value, and
the control method comprising:
generating an integrated operation amount which is an operation amount for the device on a basis of the first operation amount and the second operation amount; and
in a case where the second operation amount is subjected to invalidation processing, storing the first operation amount, the output fed back from the device and an output from the device corresponding to the integrated operation amount as machine learning data, and
wherein the first controller is configured to perform one of P control, PI control, PD control or PID control thereby providing the first operation amount, and
wherein the second controller is configured to perform one of P control, PI control, PD control or PID control thereby providing the second operation amount.

9. A non-transitory computer readable storage medium encoded with computer readable instructions, which, when executed by processor circuitry related to a control device, causes the processor circuitry to perform a method for feedback control on a predetermined device,
the method comprising:

generating a first operation amount for the device on a basis of an output fed back from the device and a target value;

generating, by including a learned model which is machine learned, a predicted output from the device on a basis of the output fed back from the device and the first operation amount; and generating a second operation amount for the device on a basis of the predicted output and the target value, generating an integrated operation amount which is an operation amount for the device on a basis of the first operation amount and the second operation amount; and in a case where the second operation amount is subjected to invalidation processing, storing the first operation amount, the output fed back from the device and an output from the device corresponding to the integrated operation amount as machine learning data, and wherein the first operation amount is generated by performing one of P control, PI control, PD control or PID control, and wherein the second operation amount is generated by performing one of P control, PI control, PD control or PID control.

10. A control system configured to perform feedback control on a predetermined device, the control system comprising:

a first controller configured to generate a first operation amount for the device on a basis of an output fed back from the device and a target value;

a predicted output generator including a learned model which is machine learned so as to generate a predicted output from the device on a basis of the output fed back from the device and the first operation amount;

a second controller configured to generate a second operation amount for the device on a basis of the predicted output and the target value;

processor circuitry configured to generate an integrated operation amount which is an operation amount for the device on a basis of the first operation amount and the second operation amount; and a storage configured to, in a case where the second operation amount is subjected to invalidation processing, store the first operation amount, the output fed back from the device and an output from the device corresponding to the integrated operation amount as machine learning data, and wherein the first controller is configured to perform one of P control, PI control, PD control or PID control thereby providing the first operation amount, and wherein the second controller is configured to perform one of P control, PI control, PD control or PID control thereby providing the second operation amount.

* * * * *